United States Patent [19]
Yamamura et al.

[11] Patent Number: 5,532,076
[45] Date of Patent: Jul. 2, 1996

[54] HYDROGEN STORAGE ALLOY AND ELECTRODE THEREFROM

[75] Inventors: Yasuharu Yamamura, Katano; Hajime Seri, Izumiotsu; Yoichiro Tsuji, Hirakata; Naoko Owada, Katano; Tsutomu Iwaki, Yawata, all of Japan

[73] Assignee: Matsushita Electric Industrial Co., Ltd., Osaka-fu, Japan

[21] Appl. No.: 219,697

[22] Filed: Mar. 29, 1994

[30] Foreign Application Priority Data

Apr. 20, 1993 [JP] Japan .................................. 5-092865

[51] Int. Cl.⁶ .................................................. H01M 4/38
[52] U.S. Cl. .......................... 429/59; 420/580; 420/586; 420/586.1; 420/587; 420/588; 420/589; 420/900
[58] Field of Search ............................... 429/59; 420/580, 420/583, 586, 586.1, 587, 588, 589, 900

[56] References Cited

U.S. PATENT DOCUMENTS

| | | | |
|---|---|---|---|
| 4,228,145 | 10/1980 | Gamo et al. | 420/900 X |
| 4,370,163 | 1/1983 | Moriwaki et al. | 420/583 X |
| 4,551,400 | 11/1985 | Sapru et al. | 429/94 |
| 4,890,794 | 2/1990 | Doi et al. | 429/59 |
| 4,923,770 | 5/1990 | Grasselli et al. | 429/101 |
| 4,946,646 | 8/1990 | Gamo et al. | 420/415 |
| 5,149,383 | 9/1992 | Seri et al. | 148/400 |
| 5,205,985 | 4/1993 | Seri et al. | 420/422 |
| 5,281,390 | 1/1994 | Gamo et al. | 429/59 X |
| 5,384,209 | 1/1995 | Bouet et al. | 420/580 X |

FOREIGN PATENT DOCUMENTS

| | | |
|---|---|---|
| 293660 | 12/1988 | European Pat. Off. . |
| 450590 | 10/1991 | European Pat. Off. . |
| 506084 | 9/1992 | European Pat. Off. . |
| 552790 | 7/1993 | European Pat. Off. . |
| 60-241652 | 11/1985 | Japan . |
| 61-176065 | 8/1986 | Japan . |
| 61-176067 | 8/1986 | Japan . |
| 1-60961 | 3/1989 | Japan . |
| 1-102855 | 4/1989 | Japan . |
| 4-301045 | 10/1992 | Japan . |
| 5-82125 | 4/1993 | Japan . |

*Primary Examiner*—Stephen Kalafut
*Attorney, Agent, or Firm*—Panitch Schwarze Jacobs & Nadel

[57] ABSTRACT

A hydrogen storage alloy preferably used for electrodes in alkaline rechargeable battery is of the general formula: $Zr_{1.2-a}Ti_aMn_vAl_wNi_xM_yCr_z$ wherein M represents at least one element selected from the group consisting of Si, Zn, Sn, Fe, Mo, Cu and Co; and wherein $0.1 \leq a < 1.2$, $0.4 \leq v \leq 1.2$, $0 < w \leq 0.3$, $0.8 \leq x \leq 1.6$, $0 \leq y \leq 0.2$, $0 \leq z \leq 0.3$, and $1.7 \leq (v+w+x+y+z) \leq 2.7$. The alloy has at least one of a C14-type Laves phase of a crystal structure similar to that of $MgZn_2$ and a C15-type Laves phase of a crystal structure similar to that of $MgCu_2$ as a main alloy phase.

11 Claims, 6 Drawing Sheets

HYDROGEN STORAGE ALLOY AND ELECTRODE THEREFROM

BACKGROUND OF THE INVENTION

1. Field of the Invention

The present invention relates to a hydrogen storage alloy which can electrochemically absorb and desorb hydrogen in a reversible manner, and it also relates to an electrode using said alloy.

2. Description of the Related Art

Storage batteries, which are widely used as power sources in a variety of applications, are typically classified into two general groups of lead-acid storage batteries and alkaline storage batteries. Between the two groups, alkaline storage batteries tend to be more reliable, and can be made smaller and lighter. Small alkaline storage batteries are generally favored for portable electric appliances, while large alkaline storage batteries have been used mainly in conjunction with industrial equipments.

While some alkaline storage batteries use, for example, air electrode or silver oxide electrode for their positive electrode, majority of the positive electrodes are nickel electrodes. Nickel electrodes have been particularly popular since they were reconfigured from a pocket type to a sintered type and became even more popular with the development of hermetic-sealing.

At present, cadmium is most commonly used to form the negative electrode of alkaline storage batteries, however other materials, including zinc, iron, hydrogen, and the like have also been employed.

There is considerable commercial interest in storage batteries that have a higher energy density than batteries currently available. Toward achieving this goal, researchers have investigated nickel-hydrogen storage batteries which incorporate metal hydride, i.e., hydrogen storage alloy electrodes. A number of proposals have been made on the production method of the hydrogen storage electrodes using metal hydrides.

The alloys in these electrodes, or the hydrides form of such alloys, can absorb and desorb hydrogen in a reversible manner, and thus the alloys and the electrodes made from these alloys have come to be known as hydrogen storage alloys and hydrogen storage electrodes (or hydrogen storage alloy electrodes), respectively.

Batteries made with hydrogen storage electrodes have a larger theoretical energy density compared to batteries formed with cadmium electrodes. Also, batteries that employ hydrogen storage electrodes are not susceptible to the formation and subsequent deformation of dendrites, which is a problem with zinc electrodes. These advantageous properties, as well as the promise for a longer cycle life and a reduction in the environmental concerns inherent in zinc- or cadmium- containing electrodes/batteries, have encouraged research into developing alloys suited for hydrogen storage electrodes, particularly negative electrodes for alkaline storage batteries.

Prior art alloys for hydrogen storage electrodes include multi-component alloys such as those of either the Ti-Ni system, or the La- (or Mm- )Ni system (where Mm is a misch metal). The multi-component alloy of the Ti-Ni system is classified as an AB type (where A is La, Zr, Ti or an element with a similar affinity for hydrogen, and B is Ni, Mn, Cr or any other transition metal). When this type of alloy is used as the negative electrode in an alkaline storage battery, the electrode exhibits a relatively large discharge capacity during the initial charging and discharging cycles. However, electrodes comprising these alloys have a disadvantage that they can not maintain their large discharge capacity after repeated charging and discharging cycles, i.e., do not have large saturation discharge capacities.

Another multi-component alloy is of the La- (or Mm- )Ni system, which is classified as an $AB_5$ type, where A and B are defined as the afore-mentioned in relation to the AB type of alloy. A number of research project have recently been developed on alloys of this system and thus the alloy have been regarded as a relatively promising alloy material for the electrodes, so far. However, the alloys of this system have several disadvantages such that they have a relatively small discharge capacity, that they have insufficient cycle life performances as the electrodes of the batteries, and that their material cost is expensive. Therefore, there has been a demand for novel alloys usable for making hydrogen storage electrodes having a large discharge capacity and a long cycle life.

A Laves phase alloy of an $AB_2$-type (where A is an element with a large affinity for hydrogen such as Zr or Ti, and B is a transition metal such as Ni, Mn or Cr) has the potential to overcome many of the shortcomings of the hydrogen storage alloys described above. Electrodes for a storage battery formed from a Laves phase alloy of the $AB_2$-type have relatively high hydrogen storing capability and they are expected to have a large discharge capacity and a long cycle life. The alloys of this system have already been proposed in, for instance, those of the $Zr\alpha V\beta Ni_7 M\delta$ system (Japanese Laid-Open Patent No. Sho 64-60,961) and of the $A_x B_y Ni_z$ system (Japanese Laid-Open Patent No. Hei 1-102, 855).

Many of the prior art hydrogen storage alloys of the Zr system and the Zr-Ti system contain vanadium (V). The alloys of those systems however suffer a disadvantage that it is difficult to obtain an electrode excellent in high-rate discharging characteristics and that their material cost is relatively expensive.

SUMMARY OF THE INVENTION

In view of the above-discussed disadvantages of the prior art hydrogen storage alloys, the present invention has, as its primary object, the provision of a hydrogen storage alloy electrode which is economical in its manufacturing cost, and excellent in its discharge capacity, its cycle life and the like performances, in particular.

It is a further object of the present invention to provide a hydrogen storage alloy which can be configured into such electrodes.

The present invention provides a hydrogen storage alloy represented by the general formula:

$$Z_{1.2-a}Ti_a Mn_v Al_w Ni_x M_y Cr_z$$

wherein M represents at least one element selected from the group consisting of silicon (Si), zinc (Zn), tin (Sn), iron (Fe), molybdenum (Mo), copper (Cu) and cobalt (Co); and wherein $0.1 \leq a < 1.2$, $0.4 \leq v \leq 1.2$, $0 < w \leq 0.3$, $0.8 \leq x \leq 1.6$, $0 \leq y \leq 0.2$, $0 \leq z \leq 0.3$, and $1.7 \leq (v+w+x+y+z) \leq 2.7$. The alloy of the present invention has at least one of a phase which has a crystal structure of the $MgZn_2$-type (C14) and a Laves phase which has a crystal structure of the $MgCu_2$-type (C15).

In a preferred embodiment, the above-mentioned hydrogen storage alloy, wherein y=z=0, is represented by the general formula:

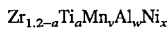

wherein $0.1 \leq a < 1.2$, $0.4 \leq v \leq 1.2$, $0 < w \leq 0.3$, $0.8 \leq x \leq 1.6$, and $1.7 \leq (v+w+x) \leq 2.7$.

In another preferred embodiment, the above-mentioned hydrogen storage alloy, wherein $z=0$, is represented by the general formula:

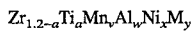

wherein M represents at least one element selected from the group consisting of S1, Zn, Sn, Fe, Mo, Cu and Co; and wherein $0.1 \leq a < 1.2$, $0.4 \leq v \leq 1.2$, $0 < w \leq 0.3$, $0.8 \leq x \leq 1.6$, $0 < y \leq 0.2$, and $1.7 \leq (v+w+x+y) \leq 2.7$.

In still another embodiment, the above-mentioned hydrogen storage alloy, wherein $y=0$, is represented by the general formula:

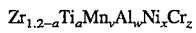

wherein $0.1 \leq a < 1.2$, $0.4 \leq v \leq 1.2$, $0 < w \leq 0.3$, $0.8 \leq x \leq 1.6$, $0 < z \leq 0.3$, and $1.7 \leq (v+w+x+z) \leq 2.7$.

The present invention also provides a hydrogen storage alloy prepared by subjecting the above-mentioned alloy to a homogenizing heat treatment in a vacuum or an inert gas atmosphere at a temperature of about 900° C. to about 1200° C. for at least one hour.

The present invention also provides a hydrogen storage alloy electrode comprising the above-mentioned alloy or a hydride thereof.

While novel features of the invention are set fourth in the preceding, the invention, both as to organization and content, can be further understood and appreciated, along with other objects and features thereof, from the following detailed description and example when taken in conjunction with the attached drawings.

DETAILED DESCRIPTION OF THE PREFERRED EMBODIMENTS

Figure 1:
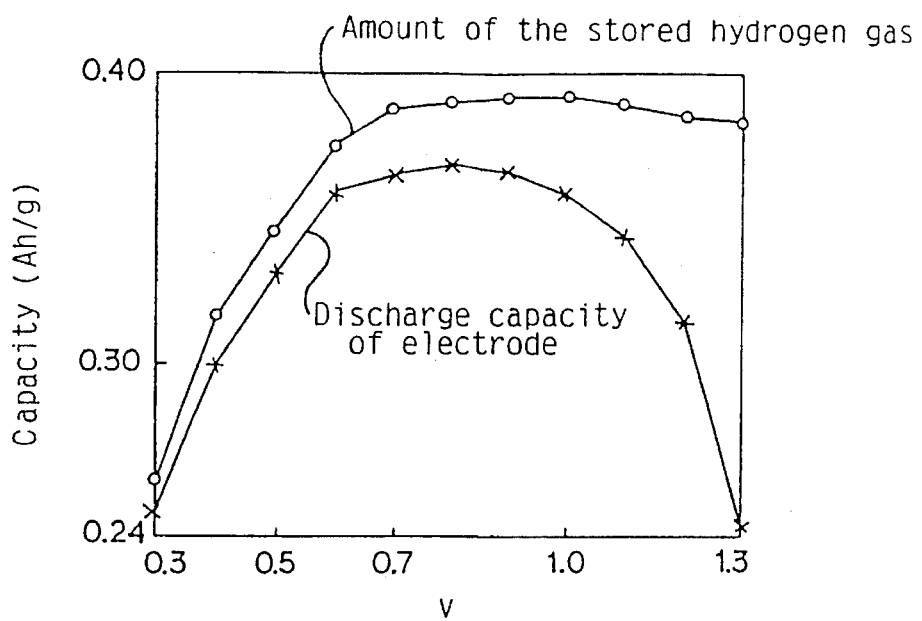
FIG. 1 is a diagram showing the curves representing the relationship between the amounts of hydrogen gas stored in the hydrogen storage alloys and the amounts v of manganese, and that between the discharge capacities of the electrodes comprising the alloys and the amounts v of manganese, in the alloy whose composition is represented by the formula: $Zr_{0.8}Ti_{0.4}Mn_vAl_{0.2}Ni_{2.0-v}$ produced in accordance with working examples of the present invention.

The present invention is directed to a hydrogen storage alloy including aluminum (Al) in place of vanadium (V), for providing an optimization of the alloy composition.

By employing aluminum in place of vanadium in the composition of the alloy, it is possible to lower the manufacturing cost of the alloy. Further, by incorporating aluminum and titanium (Ti) in place of vanadium in the alloy composition, it Is possible to obtain a hydrogen storage alloy which is excellent in the high-rate discharging characteristics compared to the prior art alloys.

By adding at least one metal component selected from the group consisting of Si, Zn, Sn, Fe, Mo and Cu to the above-mentioned alloy composition, it is possible to improve the cycle life characteristics of a rechargeable battery configured with an electrode comprising the alloy of the above composition, without seriously affecting the excellent high-rate discharging characteristics.

While the addition of Cr to the alloy composition deteriorates the high-rate discharging characteristics of the hydrogen storage alloy electrode comprising the alloy of the added composition, it drastically improves its alkali resistant property of the alloy, and thus improves the cycle life characteristics, the high-temperature storing characteristics and the like of the batteries incorporating the hydrogen storage alloy electrodes.

Although the individual values of v, w, x, y and z will be described in detail in the embodiments below, a brief discussion will be made here on the range of the sum i.e., $v+w+x+y+z$ in the hydrogen storage alloy.

If the value of the sum decreases, the amounts of the alloy phases such as Zr-Ni. Zr-Ti-Ni, or Ti-Ni formed in the alloy composition are increased. Although the capability of the alloy for absorbing and desorbing hydrogen in a reversible manner is essential for an electrode of a battery, these alloy phases can only store hydrogen but cannot however release it. The mentioned capability of the alloy composition containing such alloy phases in large amounts is therefore deteriorated.

On the other hand, if this value increases, the alloy phases such as Zr-Ni, Zr-Ti-Ni, or Ti-Ni formed in the alloy composition are decreased, but the content ratios of Mn, Ni and the like to Zr and Ti in the alloy composition are increased, thereby raising the height of the plateau in the P-C-T curve representing the hydrogen equibilium pressure for absorbing and desorbing hydrogen. The heightened plateau pressure means a lowered capability of the alloy composition for reversibly absorbing and desorbing under an inner pressure available for an ordinary rechargeable battery which depends on a characteristics of a safety valve provided on a vessel of the battery.

A central region of this value is preferably in 2.0–2.4. Although the above-mentioned disadvantage is appreciable even inside this region, it will become more prominent outsides the region. In regions under the value 1.7 and above 2.7, the capability of the alloy composition for absorbing and desorbing hydrogen in a reversible manner becomes very small.

The homogeneity and crystallinity of an alloy according to the invention can be improved by subjecting the alloy, after preparation, to a homogenizing heat treatment. Electrodes having increased discharge capacity may be prepared from alloys that have been subjected to a homogenizing heat treatment. However, if the temperature of the heat treatment is lower than about 900° C., the heat treatment has little effect on the properties of the alloy or the electrode derived therefrom. Also, if an alloy is treated at a temperature higher than about 1200° C., the discharge capacity of an electrode made from such alloy is reduced. It is believed that heat treatment temperatures above 1200° C. cause manganese to evaporate from the alloy, which adversely affects the alloy's composition and properties.

The heat treatment is observed to have no effect if continued for less than about one hour. To prevent undesirable oxidation of the alloy, the heat treatment may be conducted in either an inert has atmosphere, or in a vacuum. Preferably, the homogenizing heat treatment of the prepared alloy is conducted at a temperature of about 900° C. to about 1200° C., in a vacuum or in an inert gas atmosphere, for at least one hour.

As clearly shown by the foregoing discussion and will be made more apparent as the following detailed description proceeds, the hydrogen storage alloy prepared in accordance with the present invention can be configured into an electrode which is excellent in its discharge capacity, its alkali-resistant property and its low-temperature high-rate discharging characteristics. In addition to this, it is possible to provide a hydrogen storage alloy electrode which is relatively cheap in Its raw material cost.

In the following paragraphs, examples of the present invention will be described together with comparative preparations by referring to the attached drawings.

Preparation of Alloy Samples

Commercially available metal materials of zirconium (Zr), titanium (Ti), manganese (Mn), aluminum (Al), nickel (Ni), silicon (S1), zinc (Zn), tin (Sn), iron (Fe), molybdenum (Mo), copper (Cu), cobalt (Co) and vanadium (V) were used to prepare every Alloy Samples of the working examples and comparative preparation which will be discussed in the following disclosure. The appropriate metals were co-melted in an arc furnace in an argon atmosphere to obtain each of the alloys. The alloys were then subjected to a homogenizing heat treatment in a vacuum at a temperature of 1000° C. for 6 hours to obtain the individual Alloy Samples.

EXAMPLE 1

Alloy Samples whose compositions are listed in Table 1 below were prepared in the above-mentioned manner. A part of each of Alloy Samples was used in alloy analyses such as X-ray diffraction measurement and in normal P-C-T measurement. and the remainder was used in evaluations of the electrode characteristics. The P(hydrogen pressure)–C (composition)–T (temperature) measurement generates a pressure-composition isotherm, which is a measure of the amount of hydrogen absorbed by, or desorbed from the alloy under hydrogen gas atmosphere.

In this Example, Alloy Samples No. 1 and 7 represent comparative preparations, and Alloy Sample Nos. 2–6 represent working examples of the hydrogen storage alloy of the present invention.

Characterization of Alloy Samples

First, a powder X-ray diffraction measurement was performed on each of these hydrogen storage alloys after the homogenizing heat treatment in a vacuum. As a result of the measurement, it was confirmed that peaks in the diffraction pattern attributable to the C14-type and C15-type crystal phases were observed with each of Alloy Samples.

Amounts of hydrogen stored in Alloy Samples calculated from the results of the P-C-T measurements performed at 20° C. are also listed in Table 1. In Table 1, the amounts of the stored hydrogen are shown by converting them into quantities of electricity (Ah/g) in order to facilitate the comparison with the discharge capacity attributable to the electrochemical charging and discharging reaction.

Half Cell Test

In order to evaluate electrode characteristics as the negative electrode (anode) of the alkaline rechargeable battery in the electrochemical charging and discharging reaction, i.e.. charging/discharging cycle characteristics in particular, the following half-cell tests were performed on each of Alloy Samples Nos. 1–7.

First, each of Alloy Samples was pulverized to have a particle size of 400 mesh or smaller, and each 1 g of the alloy powders was mixed with 3 g of nickel carbonyl powder as a conductive agent and 0.12 g of polyethylene fine powder as a binder, and thereafter the obtained mixture was thoroughly stirred. The mixture was then molded with the application of pressure into disks each having a diameter of 24.5 mm and a thickness of 2.5 mm. The obtained disks were heated in a vacuum at 130° C. for one hour to melt the binder, thereby to produce hydrogen storage electrodes.

A nickel lead wire was attached to each of the hydrogen storage alloy electrode, which served as the negative electrode. A sintered nickel electrode having a capacity greater than the capacity of the negative electrode was used for the positive electrode. The negative and positive electrodes were placed, with a separator between them, in an electrolyte solution, to produce the half-cell for the half-cell test. A sulfonation-treated polypropylene nonwoven fabric was used as the separator. The electrolyte solution was an aqueous potassium hydroxide solution having a specific gravity of 1.30.

Each of the half-cells was subjected to repeated charging and discharging for 20 cycles at 25° C. During the five hour charge period, a constant current of 100 mA was supplied per one gram of hydrogen storage alloy. Discharging was performed at a constant current of 50 mA per one gram of hydrogen storage alloy, and continued until the cell voltage decreased to 0.8 Volts. The discharge capacity of the negative electrode was measured during each charging and discharging cycle. The results of the measurements are also listed in Table 1 below. In Table 1, each of the listed discharge capacities represents the largest value obtained in each cycle.

TABLE 1

| Alloy Sample No. | Composition | Amount of stored hydrogen (Ah/g) | Discharge capacity of electrode (Ah/g) |
| --- | --- | --- | --- |
| 1 | $ZrMn_{0.6}Al_{0.2}Ni_{1.2}$ | 0.31 | 0.28 |
| 2 | $Zr_{1.0}Ti_{0.2}Mn_{0.8}Al_{0.2}Ni_{1.2}$ | 0.38 | 0.36 |
| 3 | $Zr_{0.8}Ti_{0.4}Mn_{0.8}Al_{0.2}Ni_{1.2}$ | 0.39 | 0.37 |
| 4 | $Zr_{0.6}Ti_{0.6}Mn_{0.7}Al_{0.2}Ni_{1.2}$ | 0.39 | 0.37 |
| 5 | $Zr_{0.4}Ti_{0.8}Mn_{0.7}Al_{0.2}Ni_{1.1}$ | 0.38 | 0.36 |
| 6 | $Zr_{0.2}Ti_{1.0}Mn_{0.7}Al_{0.2}Ni_{1.1}$ | 0.35 | 0.32 |
| 7 | $TiMn_{0.5}Al_{0.2}Ni_{0.9}$ | 0.32 | 0.24 |

The results of the half-cell tests shown in Table 1 revealed that each of Alloy Sample Nos. 2–6 of working examples prepared in accordance with the present invention demonstrated the larger discharge capacity than those of the prior art alloys. In this connection, it is to be noted that an alloy represented by the formula: $MmNi_{3.55}Co_{0.75}Al_{0.3}Mn_{0.4}$, which had been used as the hydrogen storage alloy of the prior art nickel-hydrogen rechargeable battery, demonstrated only about 280 mAh/g in a similar test to the above.

In the following discussion, an appropriate range of the alloy composition was looked for under the condition that the electrode produced with the hydrogen storage alloy of a given composition should demonstrate a discharge capacity of 300 mAh/g or larger.

Appropriate ranges of manganese and nickel contents in the alloy composition

In this investigation, an appropriate manganese content v and an appropriate nickel content x were searched for in the alloy whose composition is represented by the formula: $Zr_{0.8}Ti_{0.4}Mn_vAl_{0.2}Ni_{2.0-v}$. The investigation was performed on the relationships between the amounts of hydrogen gas stored in the hydrogen storage alloys and the content v and that between the discharge capacities of the electrodes configured with the alloys and the content v. The results of the investigation were shown in FIG. 1.

As clearly shown from FIG. 1, it was appreciated that the alloys, whose manganese contents v were as small as 0.3, had a small amount of the stored hydrogen gas and thus gave a small discharge capacity to the electrodes produced from the alloys. The alloys whose manganese contents v were as large as 1.3 had a large amount of the stored hydrogen gas but gave a small discharge capacity to the electrodes, due to possible deterioration in the electrochemical activity with the corresponding decrease in the nickel (Ni) content. From the results of the above investigation, it is concluded that the appropriate range of the manganese content v in the composition lies between 0.4 and 1.2, and more preferably, between 0.5 and 1.0. It is further concluded that the appropriate range of the nickel content x in the composition lies between 0.8 and 1.6, and more preferably, between 1.0 and 1.5.

Appropriate range of aluminum content in the alloy composition

Next, in order to provide an appropriate aluminum content w in the alloy composition, investigations were performed on the relationships between the discharge capacities of the electrodes configured with the alloys and the aluminum content w. The compositions of the alloys used in these investigations were represented by the formulae: $Zr_{0.8}Ti_{0.4}Mn_{0.8}Al_wNi_{1.2}$, $Zr_{0.8}Ti_{0.4}Mn_{0.9}Al_wNi_{1.2}$, $Zr_{0.8}Ti_{0.4}Mn_{0.8}Al_wNi_{1.3}$, $Zr_{0.8}Ti_{0.4}Mn_{0.9}Al_wNi_{1.3}$, and $Zr_{0.8}Ti_{0.4}Mn_{1.0}Al_wNi_{1.3}$. The results of the investigations were shown in FIG. 2.

Figure 2:
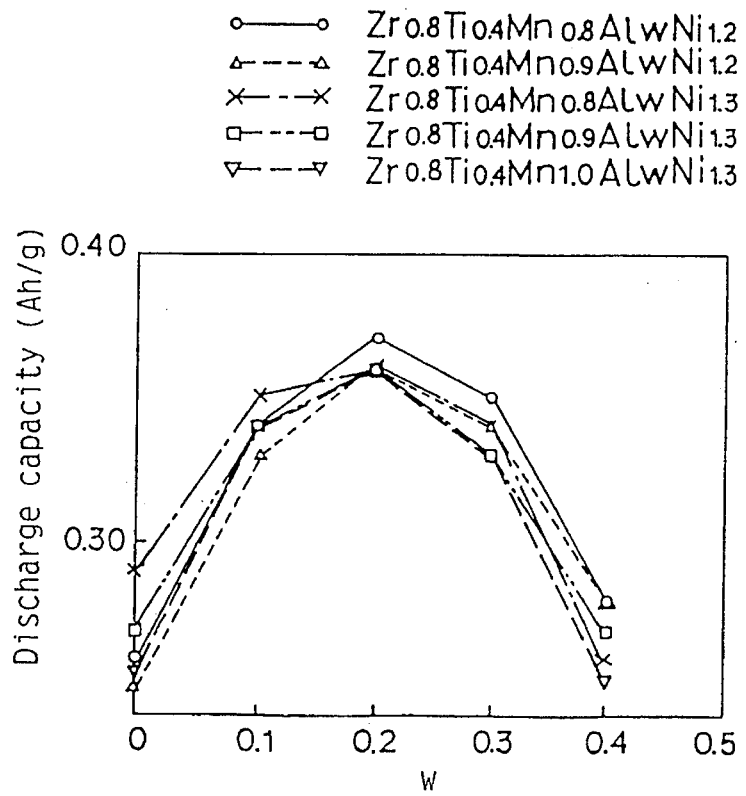
FIG. 2 is a diagram showing the curves representing the relationships between the discharge capacities of the electrodes comprising the alloys represented by the listed formulae produced in accordance with working examples of the present invention and the amounts w of aluminum contained in the alloy composition.

As clearly shown from FIG. 2, it was appreciated that the alloys whose aluminum contents w were of 0.2 gave the largest discharge capacity to the electrodes. Any alloy, wherein the aluminum content w exceeded 0.3 gave the discharge capacities in a value of 300 mAh/g or smaller to the electrodes configured with the alloy. From the result of the above investigation, it is concluded that the appropriate content w of the aluminum is 0.3 or smaller.

Appropriate range of total contents of manganese, aluminum and nickel in the alloy composition In order to confirm an effect of total amount of manganese, aluminum and nickel in the alloy composition on the performance of the alloy, investigations were performed on the relationships between the discharge capacities of the electrodes configured with the alloys and the manganese contents v. In the investigations, the alloys whose composition are represented by the formulae: $Zr_{0.8}Ti_{0.4}Mn_vAl_{0.2}Ni_{1.5}$, and $Zr_{0.2}Ti_{1.0}Mn_vAl_{0.1}Ni_{1.0}$ were used. The results of the investigations were shown in FIG. 3.

Figure 3:
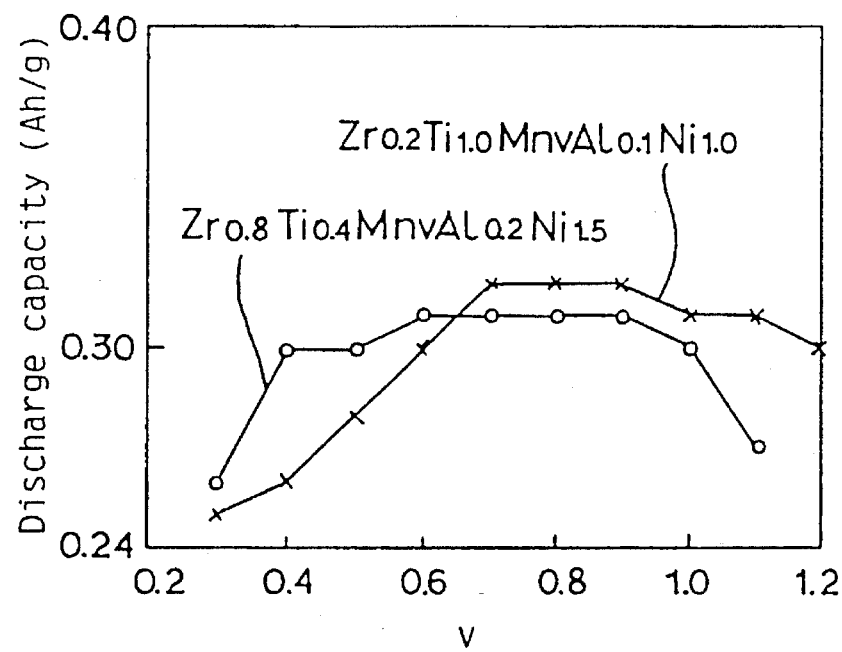
FIG. 3 is a diagram showing the curves representing the relationships between the discharge capacities of the electrodes comprising the alloys represented by the listed formulae produced in accordance with working examples of the present invention and the amounts v of manganese contained in the alloy composition.

As clearly shown from FIG. 3, it was appreciated that the alloys whose composition were represented by the formula: $Zr_{0.8}Ti_{0.4}Mn_vAl_{0.2}Ni_{1.5}$ demonstrated an electrode discharge capacity under 300 mAh/g, in the alloy composition, wherein the manganese (Mn) content v was under 0.4 or above 1.0. The alloys whose compositions were represented by the formula: $Zr_{0.2}Ti_{1.0}Mn_vAl_{0.1}Ni_{1.0}$ demonstrate an electrode discharge capacity under 300 mAh/g, in the alloy composition, wherein the manganese (Mn) content v was under 0.6. From the results of the above investigation, it is concluded that an appropriate range of the sum v+w+x. i.e., the total contents of manganese, aluminum and nickel in the alloy composition is somewhere between 1.7 and 2.7 for the sum 1.2 of the zirconium and titanium contents.

Low-temperature high-rate discharging characteristics

Investigation was made on low-temperature high-rate discharging characteristics to compare an electrode produced from the alloy of composition represented by the formula: $Zr_{0.8}Ti_{0.4}Mn_{0.8}Al_{0.2}Ni_{1.2}$ (Alloy Sample No. 3) with that from the alloy of composition is represented by the formula: $ZrMn_{0.7}V_{0.3}Ni_{1.2}$ (comparative preparation).

First, electrodes placed on the investigation were produced in the following manner.

Electrodes

Mixtures each containing one of the powders with a particle size of 400 mesh or smaller of the above-mentioned alloys and polyethylene fine powder in 3% by weight were used to produce the electrodes. Each of the mixtures was filled into a porous foamed nickel sheet having a thickness of 1.0 mm, a mean pore size of 150 micron and a porosity of 95%, which was then compressed with the application of pressure of 5 tons/cm², and then heat-treated in a vacuum at 130° C. to obtain electrodes containing each 2 g of the individual alloys.

These electrodes were used to configure half-cells in a manner similar to the above-mentioned, and then activated by subjecting them to repeated charging and discharging for 10 cycles at 25° C. in the same manner. Then, the half-cells were charged with a quantity of electricity which corresponds to 150% of the discharge capacity of the alloys, with a constant current of 40 mA per one gram of the hydrogen storage alloy at 20° C., and then discharged with a constant current of 80 mA per one gram of the hydrogen storage alloy until the cell voltage decreased to 0.8 Volts. The discharge capacity of the negative electrode was measured during each of the charging and discharging cycles. For the alloy whose composition is represented by the formula: $Zr_{0.8}Ti_{0.4}Mn_{0.8}Al_{0.2}Ni_{1.2}$ (Alloy Sample No. 3), it was found that the electrode configured with the alloy demonstrated the discharge capacity of about 320 mAh/g. For the alloy whose composition is represented by the formula: $ZrMn_{0.7}V_{0.3}Ni_{1.2}$ (comparative preparation), it was found that the electrode configured with the alloy demonstrated the discharge capacity of about 350 mAh/g. Further, after the half-cells were charged with a quantity of electricity which corresponds to 150% of the discharge capacity of the alloys, with a constant current of 40 mA per one gram of the hydrogen storage alloy at 20° C., they were brought to an air atmosphere of 0° C., and then discharged with a constant current of 400 mA per one gram of the hydrogen storage alloy until the cell voltage decreased to 0.8 Volts. At that time, the alloy represented by the formula: $Zr_{0.8}Ti_{0.4}Mn_{0.8}Al_{0.2}Ni_{1.2}$ (Alloy Sample No. 3) demonstrated the discharge capacity of about 260 mAh/g, while the alloy whose composition is represented by the formula: $ZrMn_{0.7}V_{0.3}Ni_{1.2}$ (comparative preparation) demonstrated the discharge capacity of about 220 mAh/g. From the result of the above comparison, it was concluded that the alloy prepared in accordance with the present invention, which contained aluminum in place of vanadium, was excellent in the low-temperature high-rate discharging characteristics.

EXAMPLE 2

Alloy Samples whose compositions are listed in Table 2 below, i.e. $Zr_{0.8}Ti_{0.4}Mn_{0.7}Al_{0.2}Ni_{1.2}M_{0.1}$ (wherein M represents one of Si, Zn, Sn, Fe, Mo, Cu or Co) were prepared. A part of each of Alloy Samples was used in alloy analyses such as X-ray diffraction measurement and in a normal P-C-T measurement under hydrogen gas atmosphere, and the remainder was used in evaluations of the electrode characteristics.

Characterization of Alloy Samples

As a result of the X-ray diffraction measurement, it was confirmed that the peaks in the diffraction pattern attributable to the C14-type and C15-type crystal phases were observed with every Alloy Samples.

Amounts of hydrogen stored in the Alloy Samples calculated based on the results of the P-C-T measurements performed at 20° C. are also listed in Table 2. In Table 2, the amounts of stored hydrogen are shown by converting them into quantities of electricity (Ah/g) in order to facilitate the comparison with the discharge capacity attributable to the electrochemical charging and discharging reaction.

Half Cell Test

In order to evaluate electrode characteristics as the negative electrode (anode) of the alkaline rechargeable battery in the electrochemical charging and discharging reaction, i.e., charging/discharging cycle characteristics in particular, half-cell tests similar to those in Example 1 were performed on each of Alloy Samples.

The results of the half-cell tests are also listed in Table 2 below.

TABLE 2

| Alloy Sample No. | Composition | Amount of stored hydrogen (Ah/g) | Discharge capacity of electrode (Ah/g) |
|---|---|---|---|
| 8 | $Zr_{0.8}Ti_{0.4}Mn_{0.7}Al_{0.2}Ni_{1.2}Si_{0.1}$ | 0.39 | 0.37 |
| 9 | $Zr_{0.8}Ti_{0.4}Mn_{0.7}Al_{0.2}Ni_{1.2}Zn_{0.1}$ | 0.38 | 0.37 |
| 10 | $Zr_{0.8}Ti_{0.4}Mn_{0.7}Al_{0.2}Ni_{1.2}Sn_{0.1}$ | 0.38 | 0.36 |
| 11 | $Zr_{0.8}Ti_{0.4}Mn_{0.7}Al_{0.2}Ni_{1.2}Fe_{0.1}$ | 0.39 | 0.37 |
| 12 | $Zr_{0.8}Ti_{0.4}Mn_{0.7}Al_{0.2}Ni_{1.2}Mo_{0.1}$ | 0.40 | 0.38 |
| 13 | $Zr_{0.8}Ti_{0.4}Mn_{0.7}Al_{0.2}Ni_{1.2}Cu_{0.1}$ | 0.38 | 0.36 |
| 14 | $Zr_{0.8}Ti_{0.4}Mn_{0.7}Al_{0.2}Ni_{1.2}Co_{0.1}$ | 0.39 | 0.38 |

The results of the half-cell tests shown in Table 2 revealed that each of Alloy Samples demonstrated the large discharge capacity of 350 mAh/g or larger.

Figure 4:
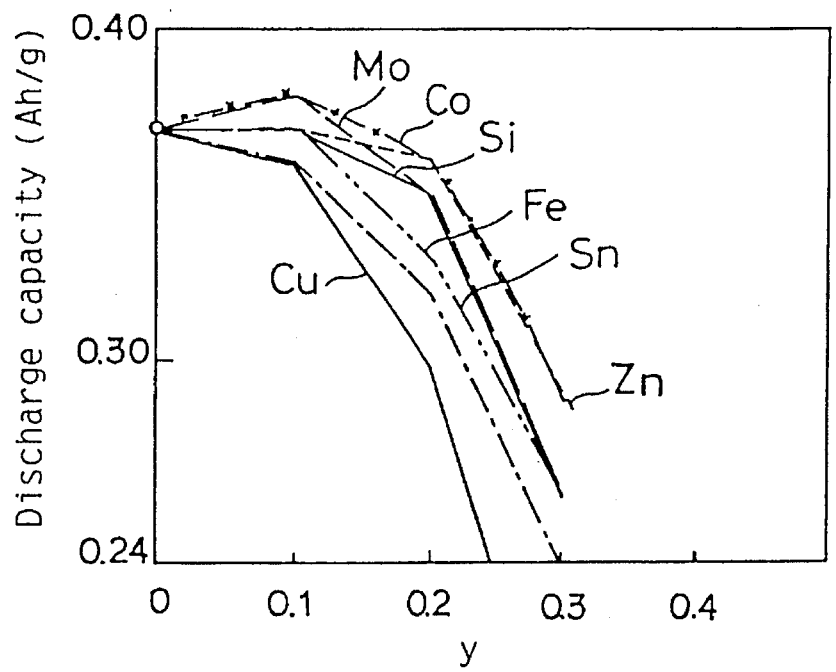
FIG. 4 is a diagram showing the curves representing the relationships between the discharge capacities of the electrodes comprising the hydrogen storage alloys represented by the formula: $Zr_{0.8}Ti_{0.4}Mn_{0.7}Al_{0.2}Ni_{1.2}M_{0.1}$ (wherein M is one of the listed metals) produced in accordance with working examples of the present invention, and the amounts y of the metal M in the alloy composition.

Appropriate metal components to be added to the alloy and their amounts of addition In the following discussion, an effect attributable to the addition of the individual metal components M was investigated by varying their amount y of the addition. The results of the investigation were summarized in FIG. 4. From the results shown in FIG. 4, it was appreciated that the addition of molybdenum or cobalt to the alloy improved the discharge capacity of the electrode configured with the alloy. It is believed that the addition of molybdenum to the alloy lowered the hydrogen gas equilibrium pressure in the hydrogen absorption and desorption process of the alloy, and thus increased the amount of the hydrogen gas stored in the alloy. It is also believed that the addition of cobalt to the alloy improved the electrochemical activity of the alloy.

However, it was also appreciated that the addition of these metal components at a content y exceeding 0.2 brought a decrease in the discharge capacities of the electrodes produced from the alloys containing these additives. It was further appreciated that the every electrodes produced from the alloys containing these metal components at a content y of 0.3 demonstrated the discharge capacities of only 300 mAh/g or smaller. From the results of the above investigation, it is concluded that the appropriate amount y of the metal component M added to the alloy is 0.2 or smaller.

Effect of added metal component on the rise-up in the discharge capacity

Figure 5:
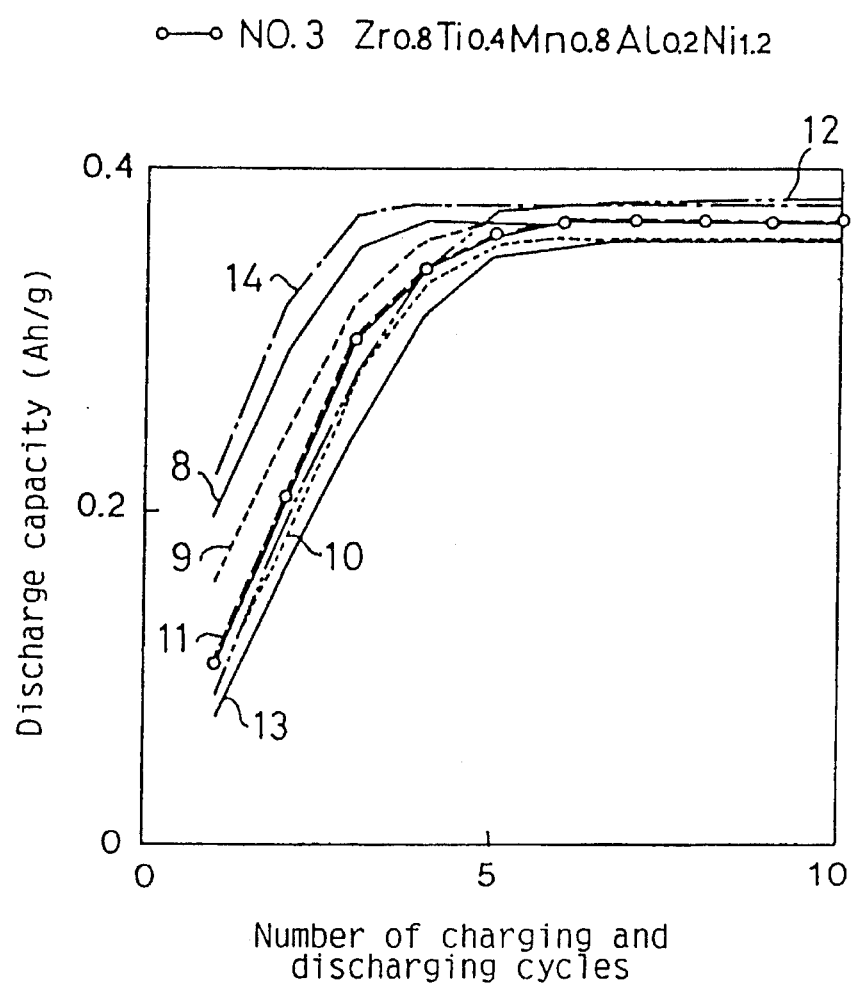
FIG. 5 is a diagram showing charging and discharging cycle characteristics curves of the electrodes configured with the hydrogen storage alloys, produced in accordance with working examples of the present invention and with comparative preparations, and listed in Table 2.

FIG. 5 shows changes in the discharge capacities during the charging and discharging cycles at the above-mentioned half-cell tests on the alloy listed in Table 2 and the alloy of composition represented by the formula: $Zr_{0.8}Ti_{0.4}Mn_{0.8}Al_{0.2}Ni_{1.2}$ (Alloy Sample No. 3 in Table 1). In FIG. 5, the abscissa represents the number of charging and discharging cycles, the ordinate represents the discharge capacity per one gram of the alloy, and numerals tagged to the curves in the diagram each correspond to the number of Alloy Samples.

From the results shown in FIG. 5, it was found that Alloy Sample No. 8, 9 or 14, which was added with silicon, zinc or cobalt, demonstrated an early rise-up in the discharge capacity of the electrode configured with any of these alloys, in comparison with the electrode of the alloy of composition represented by the formula: $Zr_{0.8}Ti_{0.4}Mn_{0.8}Al_{0.2}Ni_{1.2}$ (Alloy Sample No. 3 in Table 1). From this fact, it was appreciated that the electrochemical activities of the alloys were improved by the addition of these metal components.

Sealed-type nickel-hydrogen rechargeable battery

The alloys listed in Table 2 and the alloy whose composition is represented by the formula: $Zr_{0.8}Ti_{0.4}Mn_{0.8}Al_{0.2}Ni_{1.2}$ (Alloy Sample No. 3 in Table 1) were used to fabricate electrodes for sealed-type nickel-hydrogen rechargeable batteries in the following manner.

First, each of Alloy Samples having a particle size of 400 mesh or smaller was mixed with a dilute aqueous solution of carboxymethyl cellulose and the mixture was stirred until it formed a paste. The paste-like electrode material was applied to an electrode support comprising porous foamed nickel sheet having a thickness of 1.0 mm, a mean pore size of 150 micron and a porosity of 95%. The porous nickel sheet filled with the alloy paste was then dried at 120° C., and pressed by a pressure roller. The surface of the rolled sheet was coated with a powder of fluorocarbon resin to obtain a hydrogen storage electrode. The coated sheet was then cut into individual electrodes each having a width of 3.3 cm, a length of 21 cm and a thickness of 0.4 mm. A pair of lead plates were fixed at two predetermined positions of each electrode to form a negative electrode.

Each negative electrode was rolled up together with a positive electrode, having a capacity of 3.0 Ah which was greater than the capacity of the negative electrode, and a separator being disposed between the two electrodes, to provide a cylindrical roll of electrodes. The cylindrical electrode roll thus obtained was placed into a size SC vessel. The positive electrode was a known formed nickel electrode having a width of 3.3 cm and a length of 18 cm, and provided with a pair of lead plates which were fixed at two predetermined positions thereof.

A polypropylene nonwoven fabric having hydrophilic property was used as the separator. A solution of 30 g of lithium hydroxide dissolved in one liter of an aqueous potassium hydroxide solution having a specific gravity of 1.20, was used as the electrolyte solution. After the electrolyte solution was filled in the vessel, the open end of the vessel was sealed, resulting in a sealed-type nickel hydrogen rechargeable battery.

Figure 6:
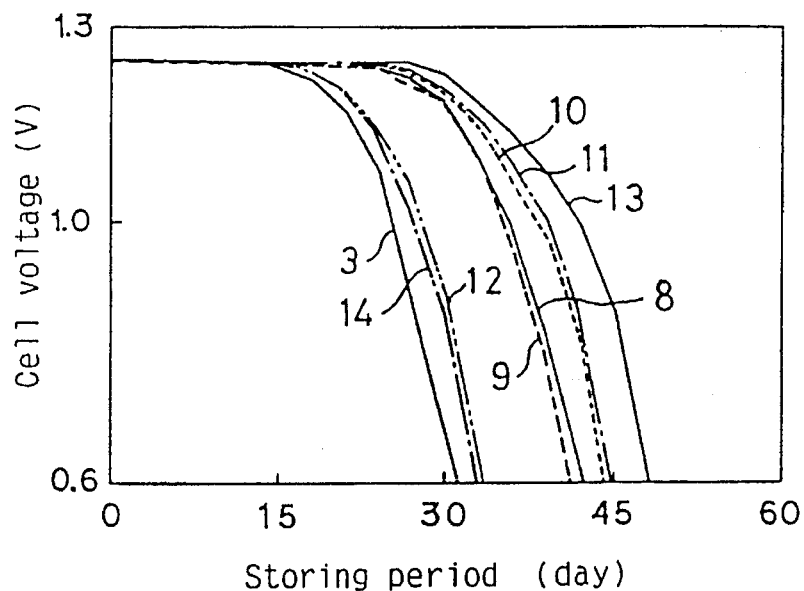
FIG. 6 is a diagram showing high-temperature storing characteristics curves of sealed-type nickel-hydrogen rechargeable batteries configured with the electrodes comprising the hydrogen storage alloys produced in accordance with working examples of the present invention and with comparative preparations, and listed in Table 2.

Each battery was activated by 20 charging and discharging cycles. During the charging cycle, each battery was charged to 120% at 0.5° C. (2 hour rate) at 20° C. The discharging was performed at 0.2° C. (5 hour rate) at 20° C., and continued until the cell voltage decreased to 0.8 Volts. Finally, each battery was stood still in an air atmosphere of 65° C., and the voltage across both electrodes of the individual batteries was measured every day during the storage. The results of the measurement were shown In FIG. 6. In FIG. 6, the abscissa represents the storing period (day) and the ordinate represent the voltage across both electrodes. Numerals tagged to the curves in the diagram each correspond to number of Alloy Samples.

Alkali-resistant property of the hydrogen storage alloy and the electrode

First set of the batteries each comprising Alloy Sample No. 3, 12 or 14, which does not contain any of silicon, zinc, tin, iron and copper, demonstrated a large decrease in the cell voltage after about 20 days during the storing period. In contrast, second set of batteries each comprising Alloy Sample No. 8, 9, 10, 11 or 13, which contains one of these metal elements, demonstrated no considerable decrease in the cell voltage before lapse of about 30 days during the storing period. From these results, it was appreciated that the addition of these metal elements improved an alkali resistant property of the hydrogen storage alloy electrodes.

EXAMPLE 3

Alloy Samples whose compositions are listed in Table 3 below were prepared. A part of each of Alloy Samples was used in alloy analyses such as X-ray diffraction measurement and in normal P-C-T measurement under hydrogen gas atmosphere, and the remainder was used in evaluations of the electrode characteristics. In Table 3, Alloy Samples Nos. 18–20 are the alloys of comparative preparations.

Characterization of Alloy Samples

As a result of the X-ray diffraction measurement, it was confirmed that the peaks in the diffraction pattern attributable to the C14-type and C15-type crystal phases were observed with every Alloy Samples.

Amounts of stored hydrogen of the Alloy Samples calculated from the results of the P-C-T measurements performed at 20° C. are also listed in Table 3. In Table 3, the amounts of stored hydrogen are shown by converting them into quantities of electricity (Ah/g) in order to facilitate the comparison with the discharge capacity attributable to the electrochemical charging and discharging reaction which are also shown in Table 3.

Half Cell Test

In order to evaluate electrode characteristics as the negative electrode (anode) of the alkaline rechargeable battery in the electrochemical charging and discharging reaction, half-cell tests similar to those in Example 1 were performed on each of Alloy Samples.

The results of the half-cell tests are also listed in Table 3 below.

TABLE 3

| Alloy Sample No. | Composition | Amount of stored hydrogen (Ah/g) | Discharge capacity of electrode (Ah/g) |
| --- | --- | --- | --- |
| 3 | $Zr_{0.8}Ti_{0.4}Mn_{0.8}Al_{0.2}Ni_{1.2}$ | 0.39 | 0.37 |
| 15 | $Zr_{0.8}Ti_{0.4}Mn_{0.7}Al_{0.2}Ni_{1.2}Cr_{0.1}$ | 0.38 | 0.36 |
| 16 | $Zr_{0.8}Ti_{0.4}Mn_{0.6}Al_{0.2}Ni_{1.2}Cr_{0.2}$ | 0.36 | 0.34 |
| 17 | $Zr_{0.8}Ti_{0.4}Mn_{0.5}Al_{0.2}Ni_{1.2}Cr_{0.3}$ | 0.34 | 0.31 |
| 18 | $Zr_{0.8}Ti_{0.4}Mn_{0.4}Al_{0.2}Ni_{1.2}Cr_{0.4}$ | 0.33 | 0.25 |
| 19 | $Zr_{0.8}Ti_{0.4}Mn_{0.5}Al_{0.1}Ni_{1.2}Cr_{0.4}$ | 0.34 | 0.25 |
| 20 | $Zr_{0.8}Ti_{0.4}Mn_{0.6}Al_{0.1}Ni_{1.1}Cr_{0.4}$ | 0.36 | 0.22 |

The results of the half-cell tests shown in Table 3 revealed that while the electrodes comprising each of Alloy Samples Nos. 15–17 prepared in accordance with the present invention demonstrated the discharge capacity of 300 mAh/g or larger, those of Alloy Samples Nos. 18–20 of comparative preparations which contain chromium in excess of 0.3, gave a large decrease in the discharge capacity of the electrodes configured with these alloys, to 300 mAh/g or smaller. From these results, it was appreciated that the discharge capacity of the electrode decreased with the increase in the chromium content in the alloy.

Appropriate chromium content in the alloy

Figure 7:
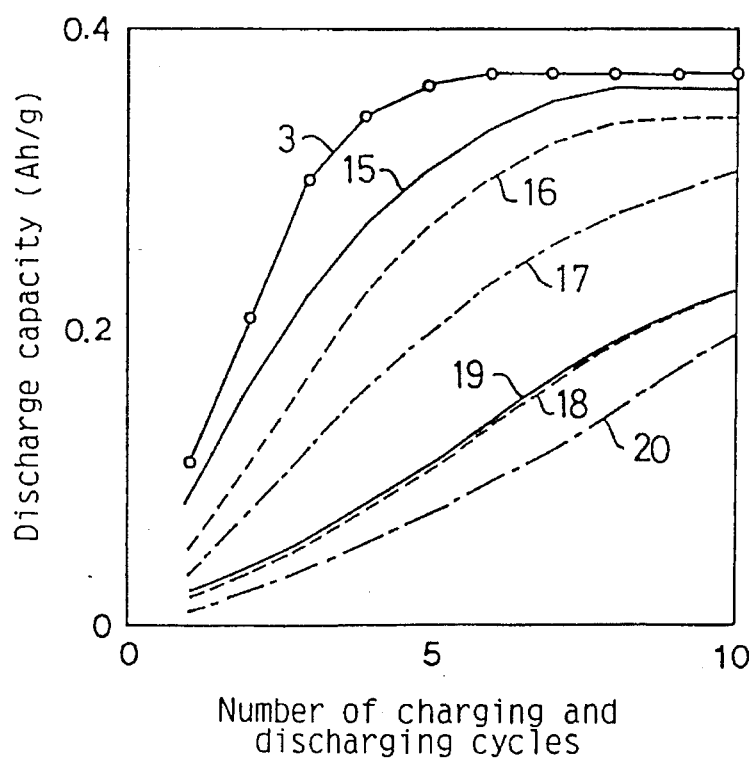
FIG. 7 is a diagram showing charging and discharging cycle characteristics curves of the electrodes comprising the hydrogen storage alloys produced in accordance with working examples of the present invention and with comparative preparations, and listed in Table 3.

FIG. 7 shows changes in the discharge capacities during the charging and discharging cycles observed at the half-cell tests performed on the electrodes comprising each of Alloy Samples listed in Table 3 in a manner similar to the above-mentioned one. In FIG. 7, the abscissa represents the number of charging and discharging cycles, the ordinate represents the discharge capacity per one gram of the alloy, and numerals tagged to the curves in the diagram each correspond to the number of Alloy Samples.

From the results shown in FIG. 7, it was found that rise-up in the discharge capacity of the electrode comprising any of the alloys containing chromium was deteriorated with the increase in the chromium content. For this reason, the alloy electrodes whose chromium contents exceed 0.3 did not make their discharge capacities large with the multiplied repetition of charging and discharging cycles.

Sealed-type nickel-hydrogen rechargeable battery

The alloys listed in Table 3 were used to produce electrodes for configuring sealed-type nickel-hydrogen rechargeable batteries in a manner similar to that in Example 2.

Figure 8:
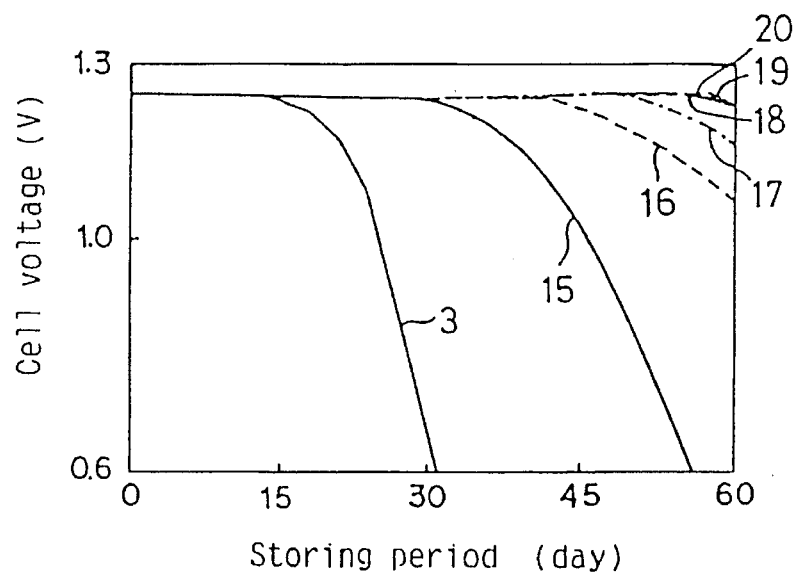
FIG. 8 is a diagram showing high temperature storing characteristics curves of sealed-type nickel-hydrogen rechargeable batteries configured with the electrodes comprising the hydrogen storage alloys produced in accordance with working examples of the present invention and with comparative preparations, and listed in Table 3.

Each battery thus produced was activated by 20 charging and discharging cycles in a manner similar to that of Example 2. During the charging cycle, each battery was charged to 120% at 0.5° C. (2 hour rate) at 20° C. The discharging was performed at 0.2° C. (5 hour rate) at 20° C., and continued until the cell voltage decreased to 0.8 Volts. Finally, each battery was stood still in an air atmosphere of 65° C. The voltages across the both electrodes of the individual batteries were measured on every day during the storage period. The results of the measurement were shown in FIG. 8. In FIG. 8, the abscissa represents the storing period (day) and the ordinate represents the voltage across both electrodes. Numerals tagged to the curves in the diagram each correspond to number of Alloy Samples listed in Table 3.

Alkali-resistant property and high temperature storing property

The battery comprising Alloy Sample No. 3, which does not contain chromium, demonstrated a large decrease in the cell voltage after about 20 days during the storing period. In contrast, batteries each comprising any of Alloy Sample Nos. 15–20, which contain chromium, demonstrated extended effective storing periods, i.e., the periods before the cell voltage began to decrease. This means that the effective storing period of the battery containing chromium was extended with the increase in the chromium content.

From these results, it was appreciated that while the addition of chromium to an alloy brought a decrease in the discharge capacity and a deterioration in the electrochemical activity of the electrode comprising such alloy, it contributed to a remarkable improvement in the alkali resistant property of the hydrogen storage alloy as well as in the high-temperature storing property of the sealed-type nickel-hydrogen rechargeable batteries configured with electrodes of such alloy.

EXAMPLE 4

Alloy Samples whose compositions are listed in Table 4 below were prepared. A part of each of Alloy Samples was used in alloy analyses such as X-ray diffraction measurement and in a normal P-C-T measurement in a hydrogen gas atmosphere, and the remainder was used in evaluations of the electrode characteristics.

Characterization of Alloy Samples

As a result of the X-ray diffraction measurement, it was appreciated the peaks in the diffraction pattern attributable to the C14-type and C15-type crystal phases were observed with every Alloy Samples.

Amounts of hydrogen stored in the Alloy Samples calculated from the results of the P-C-T measurements performed at 20° C. are also listed in Table 4. In Table 4, the amounts of stored hydrogen are shown by converting them into quantities of electricity (Ah/g) in order to facilitate the comparison with the discharge capacity attributable to the electrochemical charging and discharging reaction which are also shown in Table 4.

Half Cell Test

In order to evaluate electrode characteristics as the negative electrode (anode) of the alkaline rechargeable battery in the electrochemical charging and discharging reaction, half-cell tests similar to those in Example 1 were performed on each of Alloy Samples.

The results of the half-cell tests are also listed in Table 4 below.

TABLE 4

| Alloy Sample No. | Composition | Amount of stored hydrogen (Ah/g) | Discharge capacity of electrode (Ah/g) |
|---|---|---|---|
| 21 | $Zr_{0.8}Ti_{0.4}Mn_{0.7}Al_{0.15}Ni_{1.2}Si_{0.1}Cr_{0.1}$ | 0.38 | 0.36 |
| 22 | $Zr_{0.8}Ti_{0.4}Mn_{0.7}Al_{0.15}Ni_{1.2}Zn_{0.1}Cr_{0.1}$ | 0.38 | 0.36 |
| 23 | $Zr_{0.8}Ti_{0.4}Mn_{0.7}Al_{0.15}Ni_{1.2}Sn_{0.1}Cr_{0.1}$ | 0.37 | 0.34 |
| 24 | $Zr_{0.8}Ti_{0.4}Mn_{0.7}Al_{0.15}Ni_{1.2}Fe_{0.1}Cr_{0.1}$ | 0.38 | 0.35 |
| 25 | $Zr_{0.8}Ti_{0.4}Mn_{0.7}Al_{0.15}Ni_{1.2}Mo_{0.1}Cr_{0.1}$ | 0.39 | 0.36 |
| 26 | $Zr_{0.8}Ti_{0.4}Mn_{0.7}Al_{0.15}Ni_{1.2}Cu_{0.1}Cr_{0.1}$ | 0.37 | 0.33 |
| 27 | $Zr_{0.8}Ti_{0.4}Mn_{0.7}Al_{0.15}Ni_{1.2}Co_{0.1}Cr_{0.1}$ | 0.38 | 0.37 |

The results of the half-cell tests shown in Table 4 revealed that the electrodes comprising Alloy Samples Nos. 21–27, prepared in accordance with the present invention, demonstrated the large discharge capacity of about 350 mAh/g without exception. In particular, those of Alloy Samples Nos. 25 and 27, which contain molybdenum and cobalt respectively, demonstrated the large discharge capacities.

Effect of the added metal element

Figure 9:
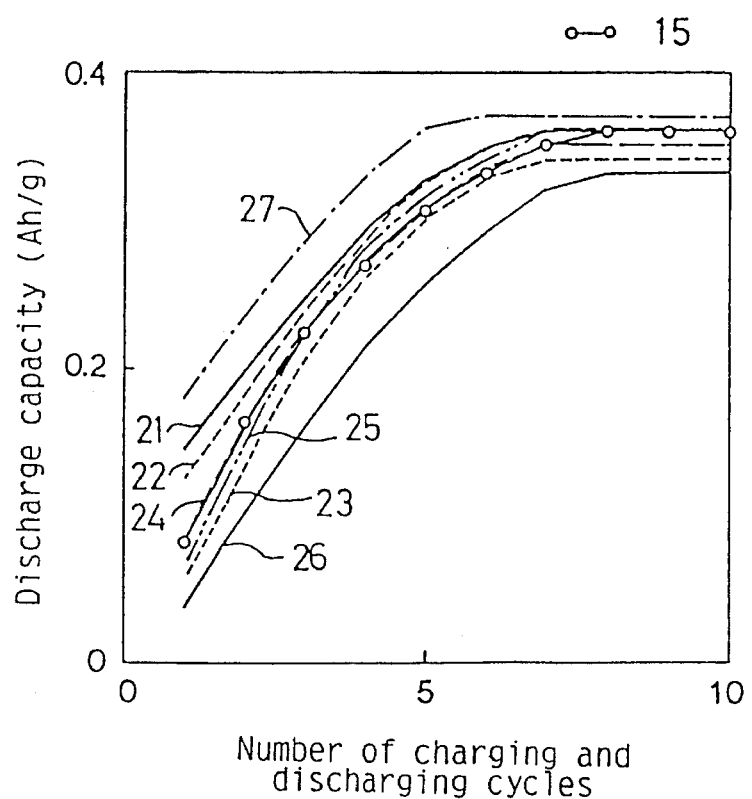
FIG. 9 is a diagram showing charging and discharging cycle characteristics curves of the electrodes configured with the hydrogen storage alloys produced in accordance with working examples of the present invention and with comparative preparations, and listed in Table 4.

FIG. 9 shows changes in the discharge capacities during the charging and discharging cycles at the above-mentioned half-cell tests performed on the electrode comprising each of Alloy Samples listed in Table 4 and Alloy Sample No. 15 in Table 3. In FIG. 9, the abscissa represents the number of charging and discharging cycles, the ordinate represents the discharge capacity per one gram of the alloy, and numerals tagged to the curves in the diagram each correspond to the number of Alloy Samples.

From the results shown in FIG. 9, it was found that rise-up in the discharge capacity of the electrode comprising any of Alloy Samples Nos. 21, 22 and 27, containing one of silicon, zinc and cobalt was improved as compared with that comprising Alloy Sample No. 15. From these results, it was appreciated that the electrochemical activity of these alloy was improved by the addition of silicon, zinc or cobalt.

Sealed-type nickel-hydrogen rechargeable battery

The alloy listed in Table 4 were used to fabricate sealed-type nickel-hydrogen rechargeable batteries in a manner similar to that in Example 2.

Figure 10:
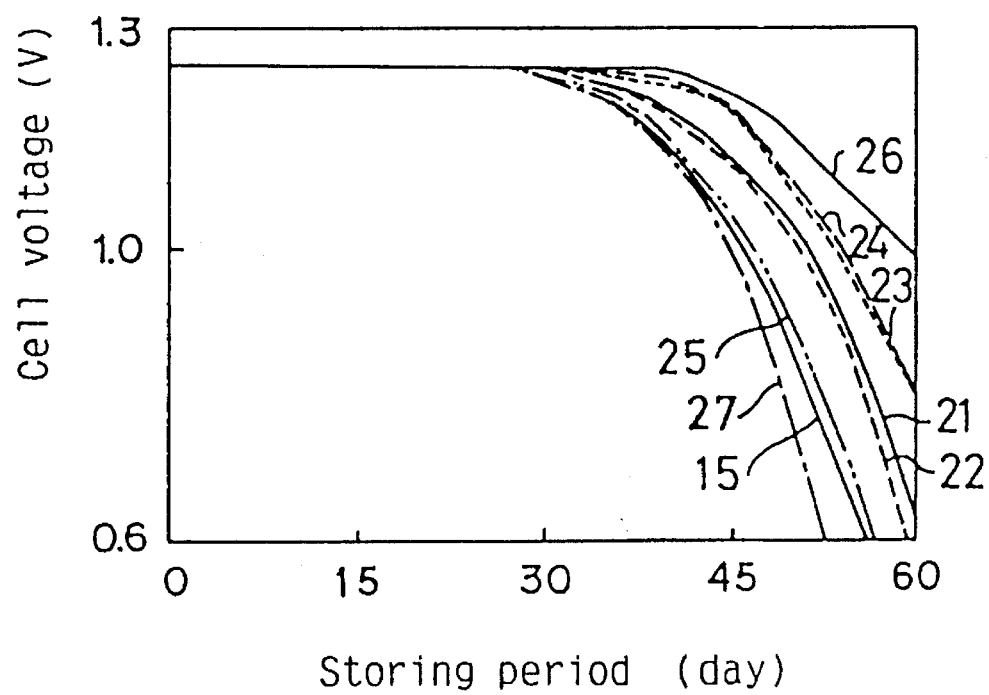
FIG. 10 is a diagram showing high temperature storing characteristics curves of sealed-type nickel-hydrogen rechargeable batteries containing the electrodes configured with the hydrogen storage alloys produced in accordance with working examples of the present invention and with comparative preparations, and listed in Table 4.

Each battery was activated by 20 charging and discharging cycles. During the charging cycle, each battery was charged to 120% at 0.5° C. (2 hour rate) at 20° C. The discharging was performed at 0.2° C. (5 hour rate) at 20° C., and continued until the cell voltage decreased to 0.8 Volts. Finally, each battery was stood still in an air atmosphere of 65° C., and the voltage across the both electrodes of each battery was measured on every day during the storage period. The results of the measurement were shown in FIG. 10. In FIG. 10, the abscissa represents the storing period (day) and the ordinate represents the voltage across the both electrodes. Numerals tagged to the curves in the diagram each correspond to number of Alloy Samples listed in Table 4. For comparison, the result of a similar test performed on Alloy Sample No. 15 is also included in the diagram.

The battery comprising Alloy Sample No. 21, 22, 23, 24 or 26, which contains one of silicon, zinc, tin, iron or copper, demonstrated an extension over about 5 days in the effective storing period before the cell voltage began to decrease, in comparison with that comprising Alloy Sample No. 15.

From the above-mentioned results, it was confirmed that the addition of silicon, zinc or cobalt to the alloy brought an improvement in the electrochemical activity of the alloy. It was also confirmed that the addition of tin, iron or copper to the alloy brought an improvement in the alkali resistant property of the alloy, without seriously deteriorating the electrochemical activity of the alloy. It was further confirmed that the addition of molybdenum or cobalt to the alloy was able to improve the discharge capacity of the electrode comprising the alloy.

In the foregoing embodiment, although the descriptions have been focused on a case, wherein only one species of the elements is added, it is needless to say that a combined addition of two or more of these elements is also possible within the scope of the invention.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A hydrogen storage alloy represented by the general formula:

$$Zr_{1.2-a}Ti_aMn_vAl_wNi_xM_yCr_z$$

wherein M represents at least one element selected from the group consisting of Si, Zn, Sn, Fe, Mo, and Cu; and wherein $0.1 \leq a \leq 1.2$, $0.4 \leq v \leq 1.2$, $0 < w \leq 0.3$, $0.8 \leq x \leq 1.6$, $0 \leq y \leq 0.2$, $0 \leq z \leq 0.3$, and $1.7 \leq (v+w+x+y+z) \leq 2.7$; said alloy having at least one of a Laves phase which has a crystal structure of the $MgZn_2$-type (C14) and a Laves phase which has a crystal structure of the $MgCu_2$-type (C15).

2. The hydrogen storage alloy in accordance with claim 1, wherein $y=z=0$.

3. The hydrogen storage alloy in accordance with claim 1, wherein $z=0$.

4. The hydrogen storage alloy in accordance with claim 1, wherein $y=0$.

5. A hydrogen storage alloy prepared by subjecting the alloy in accordance with claim 1 to a homogenizing heat treatment in a vacuum or an inert gas atmosphere at a temperature of about 900° C. to about 1200° C. for at least one hour.

6. A hydrogen storage alloy electrode comprising the alloy in accordance with claim 1 or a hydride thereof.

7. A hydrogen storage alloy electrode comprising the alloy in accordance with claim 2 or a hydride thereof.

8. A hydrogen storage alloy electrode comprising the alloy in accordance with claim 3 or a hydride thereof.

9. A hydrogen storage alloy electrode comprising the alloy in accordance with claim 4 or a hydride thereof.

10. A hydrogen storage alloy electrode comprising the alloy in accordance with claim 5 or a hydride thereof.

11. A hydrogen storage alloy electrode comprising an alloy represented by the general formula:

$$Zr_{1.2-a}Ti_aMn_vAl_wNi_xM_yCr_z$$

wherein M represents at least one element selected from the group consisting of Si, Zn, Sn, Fe, Mo, and Cu; and wherein $0.1 \leq a \leq 1.2$, $0.4 \leq v \leq 1.2$, $0 < w \leq 0.3$, $0.8 \leq x \leq 1.6$, $0 \leq y \leq 0.2$, $0 \leq z \leq 0.3$, and $1.7 \leq (v+w+x+y+z) \leq 2.7$; said alloy having at least one of a Laves phase which has a crystal structure of the $MgZn_2$-type (C14) and a Laves phase which has a crystal structure of the $MgCu_2$-type (C15).

* * * * *